(12) United States Patent
Kulkarni

(10) Patent No.: US 10,769,137 B2
(45) Date of Patent: Sep. 8, 2020

(54) INTEGRATION QUERY BUILDER FRAMEWORK

(71) Applicant: SAP SE, Walldorf (DE)

(72) Inventor: Gopalkrishna Kulkarni, Bangalore (IN)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 15/996,824

(22) Filed: Jun. 4, 2018

(65) Prior Publication Data

US 2019/0370369 A1 Dec. 5, 2019

(51) Int. Cl.
*G06F 16/2452* (2019.01)
*G06F 16/242* (2019.01)
*G06F 16/9535* (2019.01)

(52) U.S. Cl.
CPC .... *G06F 16/2428* (2019.01); *G06F 16/24522* (2019.01); *G06F 16/9535* (2019.01)

(58) Field of Classification Search
CPC .................................................. G06F 16/2452
USPC ......................................................... 707/760
See application file for complete search history.

(56) References Cited

U.S. PATENT DOCUMENTS

| 15,962,138 | | 4/2018 | Kulkarni | |
|---|---|---|---|---|
| 2006/0265385 A1* | 11/2006 | Agrawal | ............... | G06F 16/256 707/707 |
| 2010/0153862 A1* | 6/2010 | Schreiber | ................ | G06F 9/454 715/760 |
| 2012/0296891 A1* | 11/2012 | Rangan | ............... | G06F 16/3347 707/722 |
| 2013/0013291 A1* | 1/2013 | Bullock | .................. | G06F 40/30 704/9 |
| 2017/0024384 A1* | 1/2017 | Kant | ....................... | G06F 16/51 707/707 |
| 2018/0052929 A1* | 2/2018 | Liu | ....................... | G06F 16/951 707/707 |

* cited by examiner

*Primary Examiner* — Alexandria Y Bromell

(74) *Attorney, Agent, or Firm* — Fish & Richardson P.C.

(57) ABSTRACT

Techniques are described for constructing a query associated with different data sources. In one example, a method includes identifying a particular data source associated with at least one entity. Obtain a set of data source information defining each entities and a set of metadata associated with the particular data source. Then, provide at least a portion of the defined entities for selection associated with the query builder framework for presentation. In response to identifying a selection of a particular entity, the query builder UI provides for presentation a set of attributes associated with the particular selected entity for selection. In response to identifying a selection of a subset of the presented set of attributes, construct a query based on the particular selected entity and the selected subset of the presented set of attributes in a specified query format associated with the custom adapter associated with the particular data source.

14 Claims, 5 Drawing Sheets

FIG. 5A

Query Builder UI

Select Entity

Products | V |

Next

FIG. 5B

Query Builder UI

Select Attributes

☐ ID
☐ Name
☐ Price

Order By: | Name | V |

Done

FIG. 5C

Adapter Configuration (Source)

Source URL | ExampleURL
Metadata URL | ExampleMetadataURL

Query | Select id, name from Products order by Name | Build

INTEGRATION QUERY BUILDER FRAMEWORK

BACKGROUND

In software integration there can be many services that users and applications may need to query. Generally, the software integration process can be achieved by using an integration adapter. Most common integration adapters are built using the service metadata of the service and provide a typing area for the query to be applied. A user needs to traverse the metadata file manually and type the query using a query language specific to the service, which may or may not be common query language such as Structured Query Language (SQL). However, the process can get complicated, as the number of potential services can be virtually unlimited with many services having their own query language.

SUMMARY

Implementations of the present disclosure are generally directed to constructing a query for a service by using a query modeler user interface (UI). In one example implementation, a computerized method executed by hardware processors can be performed. The example method can comprise identifying a particular data source associated with at least one entity. Each of the data sources are associated with a custom adapter, the custom adapters associated with a query builder framework. A set of data source information defining each of the entities and a set of metadata associated with the particular data source are obtained. Through a query builder UI associated with the query builder framework, at least a portion of the defined entities for selection are provided for presentation. In response to identifying a selection of a particular entity via the query builder UI, the set of attributes defined in the set of obtained metadata associated with the particular data source and associated with the particular selected entity are provided for presentation via the query builder UI. In response to identifying a selection of a subset of the presented set of attributes via the query builder UI, a query is constructed based on the particular selected entity and the selected subset of the presented set of attributes in a specified query format associated with the custom adapter and associated with the particular data source.

Implementations can optionally include one or more of the following features. In some instances, the particular data source is identified in response to a selection by a user from a plurality of data sources In some instances, each custom adapter is uniquely generated by a developer at design time.

In some instances, when a set of data source information defining each of the entities and a set of metadata associated with the particular data source are obtained, a data source URL and a metadata URL are identified from a user via the query builder UI. The data source URL is associated with the set of data source information and the metadata URL is associated with the set of metadata associated with the particular data source. In some of those instances, the set of data source information from the data source URL and the set of metadata from the metadata URL is obtained via a web-based request.

In some instances, in response to constructing the query, the constructed query is executed against the particular data source. Further, a query result set is returned responsive to executing the constructed query via the query builder UI.

In some instances, in response to constructing the query, an editable version of the constructed query in the specified query format is provided for presentation via the query builder UI.

In some instances, each custom adapter is associated with a query format specific to the associated data source. Based on the custom adapter associated with the particular data source, a predefined query translation format is identified. The identified predefined query translation format is applied to the selected entity and the selected subset of the presented set of attributes to generate a translated query in the predefined query translation format. Further, the query based on the particular selected entity and the selected subset of the presented set of attributes in the specified query format is constructed.

In some instances, a plurality of predefined query translation formats are available, where each predefined query translation format is associated with a query translation key, and each custom adapter identifies a particular query translation key to be used in constructing queries for the data source associated with the custom adapter.

In some instances, in response to obtaining the set of metadata associated with the particular data source, a predefined entity metadata translation format is identified based on the custom adapter associated with the particular data source. Further, the set of metadata associated with the particular data source using the identified predefined entity metadata translation format associated with custom adapter associated with the particular data source is translated.

In some instances, a plurality of predefined entity metadata translation formats are available, where each predefined entity metadata translation format associated with a metadata translation key, and each custom adapter identifies a particular metadata translation key to be used in translating the set of metadata associated with the particular entity of the custom adapter Similar operations and processes may be performed in a system comprising at least one process and a memory communicatively coupled to at least one processor where the memory stores instructions that when executed cause at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 5A-5C illustrates an example query builder user interface (UI) associated with an implementation of the query builder framework.

DETAILED DESCRIPTION

Figure 1:
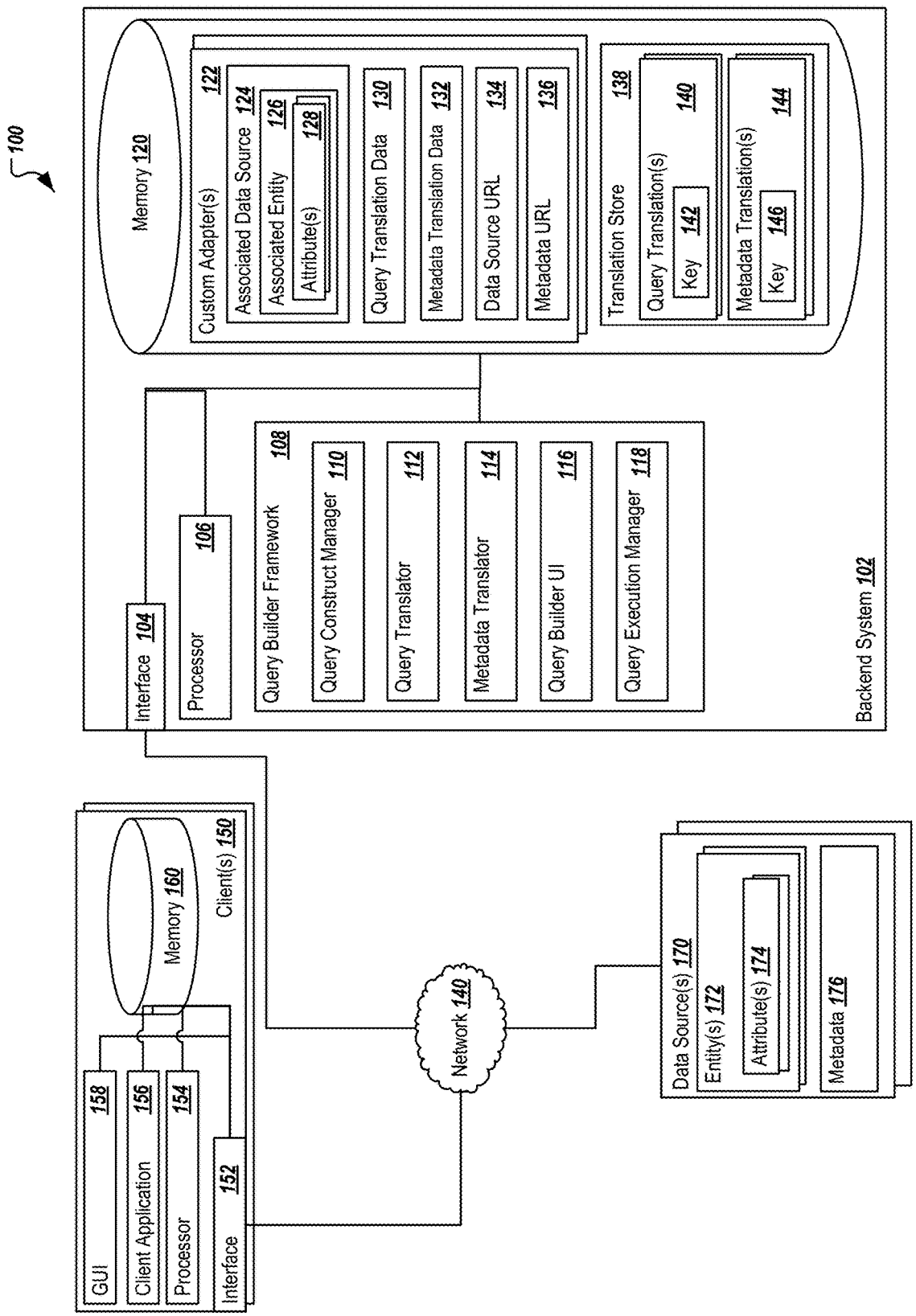
FIG. 1 is a block diagram illustrating an example system for constructing service specific queries using a query builder framework.

The present disclosure describes systems and methods for constructing a specific query by using a query modeler user interface (UI). Using the described solution, there will be a series of pages guiding the user to construct a service specific query. For example, the described solution provides a generic framework for providing UI based query modeling capabilities for different backend services with metadata information. Further, the solution allows the framework to be hooked or otherwise connected to existing integration platforms, providing mechanisms for developers to add implementations that can provide entire modeling automation. The result is a dynamic and interactive UI generated for each custom integration adapter based on a particular data source indicated, where users can construct a detailed query using guided steps based on simple selections within the UI.

In the integration platform, the developers often make service calls to different backend services to fetch or update records. In addition to following certain protocols, these backend services each demand a specific query language with which the service is compatible, or alternatively, a particular format within a particular query language. Each service may have their own query language and/or format, while in some instances, certain services may share a common query language and/or format. For example, some query languages defined for accessing hypertext transfer protocol (HTTP)-based services include:

Plain SQL query language
Specific/custom query language
Standard HTTP constructs In some cases, the consumer making a service call to the backend service has to construct either the specific query or standard HTTP construct values, and uses an HTTP client to call the service. The HTTP client call requires the user to be aware of the specifics and requirements of the backend services, such as the particular query language, to use the HTTP client. As a result, the integration process can get complicated with legacy systems having complex query languages and only a few technical users knowing the specifics of such languages. As provided in this solution, a query builder framework is provided, using a query builder UI that can build the desired query while simplifying the complicated process for the developers and users.

The described solution can also guide a user—via the query builder UI—in constructing a backend specific query when building an integration adapter. The adapter developer can use the constructed query by setting it into the HTTP client as a parameter and make a service call. The adapters usually have UI configuration properties which at runtime will make a service call to a backend.

In some instances, the described solution can also offer developers the ability to add new custom integration adapters. The custom adapters take the user provided values and query when connecting to the backend service. The query builder framework is wired to the integration platform and the custom integration adapters (also referred to as "custom adapters") for simple and intuitive query construction. A developer can provide the backend service URL to this framework both for getting the metadata and for executing the actual query against, and the same developer can provide small implementations for parsing the metadata and reconstructing the specific query. Using this process, a seamless query modeling experience is offered.

The described solution provides a number of advantages over existing query creation solutions. Without the solution, each service query must be either constructed manually based on a defined knowledge of the service and its requirements, or a specific implementation for each service must be provided to the integration platform itself, a solution that is not scalable based on the number of backend services being used and added every day. Further, the typical user may not be a technical user with knowledge of a particular service. By providing this solution, users can easily identify and specify the particular entities and attributes to be considered in a particular query, and do not need to know or research the particular format in which the query is to be provided. The solution also ensures each service query generated by the framework is a valid query without errors, typos, or syntax-based issues, which helps the prevention of failures at the production system during runtime. As such, the generated query can be used to check the service for the runtime behavior before deploying to the integration platform and later to the production system. Further, the system can include user authentication techniques to ensure that any data sources to be queries by a user are those with which the user is authorized to view and interact.

Turning to the illustrated implementation, FIG. 1 is a block diagram illustrating an example system 100 for constructing a query associated with different data sources using a described query builder UI. As illustrated in FIG. 1, system 100 is associated with a system for generating and using one or more custom adapters 122, wherein each custom adapter 122 is associated with a particular data source 124. Each data source 124 can be associated with or include one or more entities 126, each entity 126 associated with one or more attributes 128. In some instances, each entity 126 may be a specific table in a database or otherwise associated with the data source 124. In some cases, one table within the data source 124 corresponds to one entity 126. In some instances, a data source 124 may be associated with a single entity 126, while other data sources 124 may be associated with a plurality of entities 126. The data source 124, entity 126, and attribute 128 can be stored remotely at one or more data sources 170 (and stored as entities 172 and attributes 174, as illustrated). The data source 124 may identify the remote data source 170, and entity 126 and attribute 128 information may be obtained from the data source 170 via network 140.

In general, the illustrated system 100 can incorporate a plurality of systems to perform and use the custom adapters 122 to generate easy-to-build queries, including a backend system 102, one or more clients 150, and one or more data sources 170, and can allow the illustrated components to share and communicate information across devices and systems (e.g., via network 140). In some instances, at least some or all of the components may be cloud-based components or solutions, as well as web services, while in others, non-cloud-based systems may be used. In some instances, non-cloud-based systems, such as on-premise systems, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, backend system 102 and client 150 may be any computer or processing device such as, for example, a blade server, general-purpose personal computer (PC), Mac®, workstation, UNIX-based workstation, or any other suitable device. Moreover, although FIG. 1 illustrates a single backend system 102, the system 100 can be implemented using a single system or more than those illustrated, as well as computers other than servers, including a server pool. In other words, the present disclosure contemplates computers other than general purpose computers, as well as computers without conventional operating systems. Similarly, the client 150 may be any system which can request data and/or interact with the backend system 102. The client 150, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others.

In general, the backend system 102 may be associated with the execution of one or more backend or business applications, including a query builder framework 108 and its associated functionalities. In some instances, the backend system's 102 primary functionality may relate to actions associated with the construction of a query as described herein, including the defining and management of one or more custom adapters 122 associated with particular data sources 124, and which are used to generate queries specific to particular entities 126 and their attributes 128. The one or more custom adapters 122 may include a set of query translation data 130 and a set of metadata translation data 132, where those sets of translation data provide an indication to the query builder framework 108 how to interpret metadata associated with the corresponding data source 124, as well as how to construct a query directed to the data source. In some instances, the custom adapter 122 may identify a particular query translation key (corresponding to query translation key 142) and a metadata translation key (corresponding to metadata translation key 146). When using the custom adapter 122, those keys may be used to identify a separate translation (either query translation 140 or metadata translation 144. The custom adapter 122 may also include a stored version of a data source URL 134 and/or a metadata URL 136, where those URLs provide links or references to the associated data source 124 itself, or a URL associated with the data source's metadata (e.g., metadata 176) of the corresponding data source 170.

In some instances, the backend system 102 may be associated with an end-to-end business solution system, enterprise resource planning (ERP) systems, customer resource management (CRM) systems, business intelligence systems, cloud platform systems, supplier management (SM) systems, or any other suitable system, including non-business-related systems. In general, the backend system 102 executes at least a query builder framework 108, which can be interacted with by one or more client applications 156, and can access data from or provide access to data from one or more data sources 170.

The illustrated query builder framework 108 is used to manage and use the custom adapters 122 to generate one or more queries. To support the query construction solution described herein, each custom adapter 122 identifies an associated data source 124. In some instances, the custom adapter 122 may store or otherwise have reference to the particular entities 126 associated with the data source 124. In others, those entities 126 may be retrieved or otherwise identified in response to a request to build or construct a query associated with the particular data source 170. The entity 172 can include but is not limited to a database table or combination of tables (e.g., a union or join of two or more tables, database projections or views), database schema, or database system. The attributes 128 can represent columns or data information of the entity 126/172. Each custom adapter 122 can contain or identify query translation data 130 that specifically defines a particular query translation for the data source 124. In other instances, the query translation data 130 can be a unique identifier used to link the particular custom adapter 122 to a particular query translation 140 stored in the translation store 138 (e.g., via a particular key 142). The metadata translation data 132 can specifically define a particular metadata translation identifying one or more operations necessary to interpret the metadata of the associated data source 124. In other instances, the metadata translation data may reference or link to a unique identifier used to link the particular custom adapter 122 to a particular metadata translation 144 in the stored translation store 138. The one or more query translations 140 and one or more metadata translations 144 can be a programming implementation adhering to the framework contract. In some instance of the implement, the query builder framework 108 identifies the data source URL 134 and the metadata URL 136 that are provided from the user. The data source URL 134 can be used to obtain or retrieve the information from a data source for a query construction, and the metadata URL 136 can be used to obtain or retrieve the information for a metadata associated with the particular data source in order to identify particular entities and attributes associated with the data source 170.

The translation store 138 can hold, store, or reference the particular translations used to understand and interact with particular data sources 170. In some instances, such as where one or more query translations 140 are provided for different services, including those services supporting or otherwise requiring a specific query language, an object reference of the implementation will be held by the store, the references associated with a key 142 or other unique identifiers associated with the translation requirements. The corresponding identifier can be associated with the custom adapter 122, so that the proper translation can be used in constructing the query. The translation store 138 can also store one or more metadata translations 144, where the metadata translations 144 are associated with particular data sources 124 and are used to parse or process metadata associated with a service. In some instances, particular metadata translations 144 can be associated with a key 146 or other unique identifiers associated with the metadata translation of one or more services or data sources. The corresponding identifier can be associated with one or more custom adapters 122 and used to interpret and interact with the metadata 176 of the corresponding data sources 170. The query translations 140 represent the custom implementations of the query translator contract, and the metadata translations 144 represent the custom metadata translation implementations of different services. In some instances, one or more of the custom adapters 122 may identify a particular metadata translation key 146 to be used in translating the set of metadata associated with the particular entity 126.

Returning to the query builder framework 108, the framework 108 is illustrated as including five components: a query construct manager 110, a query translator 112, a metadata translator 114, a query builder UI 116, and a query execution manager 118. Some or all of the components may be combined into a single component or the query builder framework's inherent functionality, while portions of the solution may also be separated into different and/or external components and various applications, agents, and/or other software. In general, the query builder framework 108 is used to create the query builder UI 116 using the service metadata associated with a data source 124 corresponding to a particular custom adapter 122. The various illustrated components may be used in combination to provide the described functionality, while other implementations may include more or different components to perform the various operations.

The query construct manager 110 is a central component used to orchestrate or manage the other components, such as the query translator 112, the metadata translator 114, the query builder UI 116, and the query execution manager 118. In some instances, the query construct manager 110 can be responsible for creating a query modeler UI, which can be used by a developer to create a custom adapter 122 to be used later. Along with the query execution manager 118, the query construct manager 110 can take the constructed query and initiate the execution of the query against the data source 170 using the constructed query.

The query translator 112 can perform one or more different custom implementations provided by a developer for supporting services using a specific query language. The query translator 112 can access the information defining how a particular query is to be formatted (e.g., the particular query translation 140), and can ensure that the input types, sequence, and syntax of the constructed query matches the defined requirements of the data source 170 associated with a particular query.

The metadata translator 114 can perform one or more different custom implantations provided by a developer for parsing and interpreting metadata 176 information retrieved from a particular data source 170. In particular, the metadata translator 114 can identify and apply a particular metadata translation 144 (e.g., as defined or referenced by a particular custom adapter 122) to a set of obtained metadata 176 of the data source 170.

The query builder UI 116 can be defined to generate and manage a user interface containing the UI pages and visualizations used to build and construct the query. The query builder UI 116 can present information about a particular data source 170, its various entities 172, and attributes 174 associated with those entities 172 to users in order to obtain or gather information from corresponding user input (e.g., via GUI 158 of the client 150), and use that information in connection with the other components to determine how to generate a particular query with an associated data source 170. In some instances of the implementation, the query builder UI 116 is generated by the query construct manager 110. The query builder UI 116 can provide a series of pages or screens that guide users in constructing service specific queries. In some instances, users may initially identify a particular data source 170 to be associated with the query. In response to identifying the data source 170, the query builder UI 116 and the query construct manager 110, among others, can be used to identify the custom adapter 122 associated with the identified data source 170 (via the associated data source 124 definition), and can present a set of entities 172 associated with the selected data source 170. Based on the selected entity, the query builder UI 116 can then present a set of attributes 174 corresponding to the selected entity, allowing users to select particular attributes to be included in the constructed query. In some instances, additional information or parameters may be added via the query builder UI 116, such as providing a request on how results should be ordered, filtered, sorted, or otherwise presented. After constructing the query via the query builder UI 116, the query execution manager 118 can be used to execute the constructed query against the service of the data source 170. The results of the query execution can be returned, and, in some instances, can be presented via the query builder UI 116. In some instances, prior to executing the constructed query, the query builder UI 116 may allow users to interact with and modify the constructed query. For example, additional parameters and information can be added or removed from the constructed query prior to actually executing the query. In such instances, users can be provided with a constructed query in the correct format, and can modify the constructed query into a fine-tuned or otherwise modified query without affecting the syntax or format requirements of the data source 170.

As illustrated, the backend system 102 includes interface 104, processor 106, the query builder framework 108, and memory 120. The interface 104 is used by the backend system 102 for communicating with other systems in a distributed environment—including within the environment 100—connected to the network 140, e.g., one or more clients 150 and data sources 170, among others, as well as other systems communicably coupled to the illustrated backend system 102 and/or network 140. Generally, the interface 104 comprises logic encoded in software and/or hardware in a suitable combination and operable to communicate with the network 140 and other components. More specifically, the interface 104 may comprise software supporting one or more communication protocols associated with communications such that the network 140 and/or interface's hardware is operable to communicate physical signals within and outside of the illustrated environment 100. Still further, the interface 104 may allow the backend system 102 to communicate with one or more clients 150 to receive particular queries and information requests, as well as to receive updates or interactions with the custom adapters 122 via client application 156 and/or from one or more data sources 170, as described in the present disclosure.

Network 140 facilitates wireless or wireline communications between the components of the environment 100 (e.g., between the backend system 102 and a particular client 150), as well as with any other local or remote computer, such as additional devices, clients (e.g., client 150), servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the backend system 102, and data sources 170, among others) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-networks, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The backend system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the backend system 102, in particular those related to the query builder framework 108. Specifically, the processor(s) 106 executes the algorithms and operations described in the illustrated figures, as well as the various software modules and functionality, including the functionality for sending communications to and receiving transmissions from clients 150 and other illustrated components, as well as to other devices and systems. Each processor 106 may have a single or multiple core, with each core available to host and execute an individual processing thread. In particular, processor 106 can be used to execute the query builder framework 108 described previously and its functionality. In some instances, one or more of the components of the query builder framework 108 may be executed remotely by one or more remote processors 106, as well.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Memory 120 of the backend system 102 may represent a single memory or multiple memories. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data (e.g., one or more custom adapters 122 and any associated data source 124, query translation data 130, metadata translation data 132, data source URL 134, and metadata URL 136, as well translation store 138, as well as others, etc.), including financial data, user information, administrative settings, password information, caches, applications, backup data, repositories storing business and/or dynamic information, and any other appropriate information associated with the backend system 102 including any parameters, variables, algorithms, instructions, rules, constraints, or references thereto. Additionally, the memory 120 may store any other appropriate data, such as VPN applications, firmware logs and policies, firewall policies, a security or access log, print or other reporting files, as well as others. While illustrated within the backend system 102, some or all of memory 120 may be located remote from the backend system 102 in some instances, including as a cloud application or repository, or as a separate cloud application or repository when the backend system 102 itself is a cloud-based system. Further, at least some of memory 120 may be associated with data or information located at one or more remote data sources 170. That data may be accessed at the data sources 170 and used in the described processes, and the related data may, in some instances, be stored in memory 120 for local use. In some instances, at least a portion of the accessed data from the data sources 170 may be persisted locally in memory 120, such as in a cache or other local storage to reduce network resources and increase the speed of data access and availability.

As illustrated and described, one or more clients 150 may be present in the example system 100. Each client 150 may be associated with requests transmitted to the backend system 102 related to the client application 156 executing on or at the client 150, including those related to queries constructed via the query builder framework 108, as well as to requests to view or visualize particular entities 172 and queries submitted to access at least a portion of the entity 172. Different clients 150 may interact with different custom adapters 122 via the query builder framework 108 and the query execution manager 118, where the query execution manager 118 and the query builder UI 116 are used to determine how and what to provide in response to the received user selections.

As illustrated, each client 150 may include an interface 152 for communication (similar to or different from interface 104), at least one processor 154 (similar to or different from processor 106), the client application 156, memory 160 (similar to or different from memory 120), and a graphical user interface (GUI) 158.

The illustrated client 150 is intended to encompass any computing device such as a desktop computer, laptop/notebook computer, mobile device, smartphone, personal data assistant (PDA), tablet computing device, one or more processors within these devices, or any other suitable processing device. In general, the client 150 and its components may be adapted to execute any operating system, including Linux, UNIX, Windows, Mac OS®, Java™, Android™, or iOS. In some instances, the client 150 may comprise a computer that includes an input device, such as a keypad, touch screen, or other device(s) that can interact with the client application 156, and an output device that conveys information associated with the operation of the applications and their application windows to the user of the client 150. Such information may include digital data, visual information, or a GUI 158, as shown with respect to the client 150. Specifically, the client 150 may be any computing device operable to communicate queries or communications to the backend system 102, other clients 150, and/or other components via network 140, as well as with the network 140 itself, using a wireline or wireless connection. In general, client 150 comprises an electronic computer device operable to receive, transmit, process, and store any appropriate data associated with the environment 100 of FIG. 1.

Client application 156 may be any suitable application, program, mobile app, or other component. As illustrated, the client application 156 interacts with the backend system 102 to perform queries and other database and/or table-related operations via query builder framework 108. In some instances, the client application 156 may be a browser, where the functionality of the client application 156 may be realized using a web application or website the user can interact with via the client application 156. In other instances, the client application 156 may be a remote agent, component, or client-side version of the backend system 102, or another application, which can interact with the custom adapters 122 via the query builder framework 108. In some instances, the client application 156 may interact directly with the backend system 102.

In some instances, the client application 156 may be programmed to initiate change detection algorithms on its own, even without submitting a new query to the backend system 102. In some instances, the client application 156 may be able to communicate with the query construct manager 110, such as by calling the query execution manager 118 via a particular application programming interface (API) or other method, and receiving system values from the user. If a request is received, the client application 156 may be able to trigger a new query generation to receive a set of data from the associated data source 124 included in the custom adapters 122.

GUI 158 of the client 150 interfaces with at least a portion of the environment 100 for any suitable purpose, including generating a visual representation of the client application 156 and/or the content associated with the client application 156 and, in some cases, results or portions of the custom adapters 122. In particular, the GUI 158 may be used to present screens or UIs associated with the client application 156. In some instances, those screens or UIs may include buttons or other interactive elements allowing users to initiate a request for a refresh, or to perform actions within the application 156 which may result in a query to the backend system 102. GUI 158 may also be used to view and interact with various Web pages, applications, and Web services located local or external to the client 150. Generally, the GUI 158 provides the user with an efficient and user-friendly presentation of data provided by or communicated within the system. The GUI 158 may comprise a plurality of customizable frames or views having interactive fields, pull-down lists, and buttons operated by the user. For example, the GUI 158 may provide interactive elements that allow a user to view or interact with information related to the operations of processes associated with the backend system 102, including the presentation of and interaction with particular entity 126 included in the one or more custom adapters 122. In general, the GUI 158 is often configurable, supports a combination of tables and graphs (bar, line, pie, status dials, etc.), and is able to build real-time portals, application windows, and presentations. Therefore, the GUI 158 contemplates any suitable graphical user interface, such as a combination of a generic web browser, a web-enable application, intelligent engine, and command line interface (CLI) that processes information in the platform and efficiently presents the results to the user visually.

FIG. 1 further includes one or more data sources 170, which may be one or more external and/or cloud-based data sources 170 storing one or more entities 172 with one or more attributes 174 and a metadata information 176. The entities 172 may be standalone tables, or such tables may be incorporated with or a part of a join to one or more of the custom adapters 122 in backend system 102. In some instances, the data sources 170 can feed data information to the custom adapters 122 via the query builder framework 108 and its query construct manager 110, while in other instances the data sources 170 can update the custom adapters 122 in other manners.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
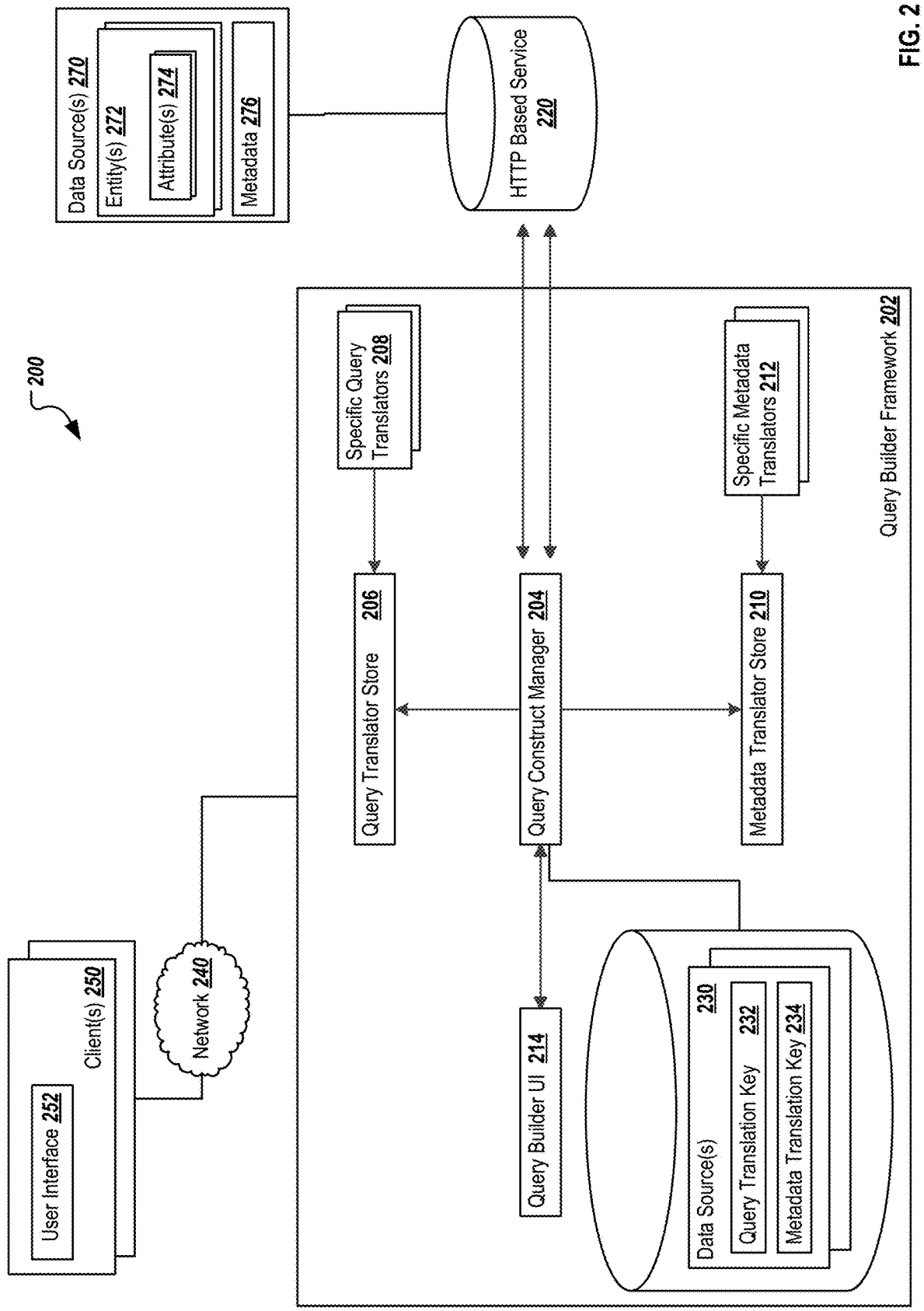
FIG. 2 is a block diagram illustrating a simplified view of an alternative example system with example components of a query builder framework.

FIG. 2 is a block diagram illustrating an example system with components of the query builder framework. As illustrated in FIG. 2, system 200 is associated with or connected to at least one HTTP based service 220 for integration into the query builder framework and for constructing queries directed to the service and its data. The illustrated system 200 represents a simplified version of system 100 including several additional specific components. Other implementations of system 200 can be implemented using separate or alternative components instead.

As illustrated, system 200 includes a query builder framework 202 and one or more clients 250 communicably connected via network 240. The client 250 may be any computer or system attempting to query or access the entities 272 referenced by the query construct manager 204 using service calls or methods as defined within the system 200. The components described in FIG. 2 may be similar to or different from the components described in FIG. 1. For example, the query builder framework 202, the query construct manager 204, the query translator store 206, metadata translator store 210, and query builder UI 214 may be similar to or different from query builder framework 108, query construct manager 110, the query translator 112, metadata translator 114, and query builder UI 116 of FIG. 1. The one or more clients 250 may be generally similar to or different from the one or more clients 150 of FIG. 1, and are shown in a simplified manner for purposes of the discussion related to FIG. 2.

The query construct manager 204 (which may be similar to or different from the query construct manager 110 in query builder framework 108) can be used to orchestrate or manage the other components, such as the query translator store 206, the metadata translator store 210, and the query builder UI 214. In some instances, the query construct manager 204 can be responsible for creating a query modeler UI and take the constructed query and initiate the execution of the query against the data source 270 using the constructed query. In some instances, the query construct manager 204 can receive or obtain the service metadata from the HTTP service 220 by accessing the set of metadata 276 and using that information to determine the specific entities and attributes of the data source 270. In other words, a particular data source 270, the data source entity information 272 information, and the data source metadata information 276 may be accessible by the query construct manager 204 through the HTTP based service 220.

In some instances, one or more specific query translators 208 may be manually or automatically associated with a query translator store 206. The specific query translators 208 can be stored in or accessible to the query translator store 206, such that the set of the query translation formats can be applied to the particular data sources 270 and their associated entities 272 when constructing a query through the described processes. In some instances, a particular data source 270 or its entities 272 may be associated with a query translation key (which can be stored with local information associated with the data source 230, e.g., at a custom adaptor stored in or associated with the query builder framework 202), where certain query translators 208 are also associated with those specific keys. Using the identified key, the specific query translator 208 associated with a data source 270 can be identified, accessed, and used to generate any future queries based on one or more user selections, where the translators 208 allow the query to be generated in a format and/or syntax corresponding to the requirements of the data source 270. When a particular data source is identified via the query builder UI 214, the query construct manager 204 can transform or associate the specific query translator 208 to the associated query translator key 232 for use in constructing the queries. In some instances, a data source URL may be received via the query builder UI 214, which can then be used to identify a particular data source 270 upon which the query is to be executed. Using that information, the query construct manager 204 can access, via the HTTP based service or directly from the data source 270, the entity data 272, the attribute data 274, and the metadata data 276.

Additionally, one or more specific metadata translators 212 may be manually or automatically associated with a metadata translator store 210. The specific metadata translators 212 can be stored in the metadata translator store 210, such that the set of the metadata translation formats can be applied to the associated data sources 270 containing the corresponding metadata translator key 234 as queries are received. In this instance, a metadata URL is received via the query builder UI 214, the query construct manager 204 can identify the associated data source 270 using the metadata information.

The data sources 270 can be accessed by the query construct manager 204 through the HTTP based service 220 with the corresponding identified metadata information 276. The HTTP based service 220 can be a HTTP client server or servers that may be provided by a single or multiple components and systems. In some instances, the languages used to access the HTTP based service 220 can include, but are not limited to, a standard SQL query language, a custom SQL or other query language, or standard HTTP constructs, among others.

The client 250 can interact with the query builder UI 214 and query construct manager 204 via network 240. The client 250 may be any suitable computer or system associated with a user or application authorized to interact with the data sources 270 and their associated entities 272. In some instances, the client 250 may have a user interface 252 through which a query builder UI is provided (via the query builder UI 214 component) that guides the user through a query construction process. Through the user interface 252, users can identify a particular data source 270 to be queries. Based on the selected data source 270, the query construct manager 204 can determine the entities 272 associated with the data source 270 and make those selectable by the user. In response to receiving a selection of a particular entity or entities 272, the attributes 274 corresponding to those entities 272 can be selected in a next screen or presentation. Once those attributes 274 are selected, along with any other appropriate information, the query construct manager 204 can construct a query based on those selections and the specific formatting requirements of the data source 270. The resulting query can be presented to the user interface 252 for review, edits, and execution. In some instances, the query construct manager 204 can automatically execute the constructed query against the data source 270 once the selections are made.

Figure 3:
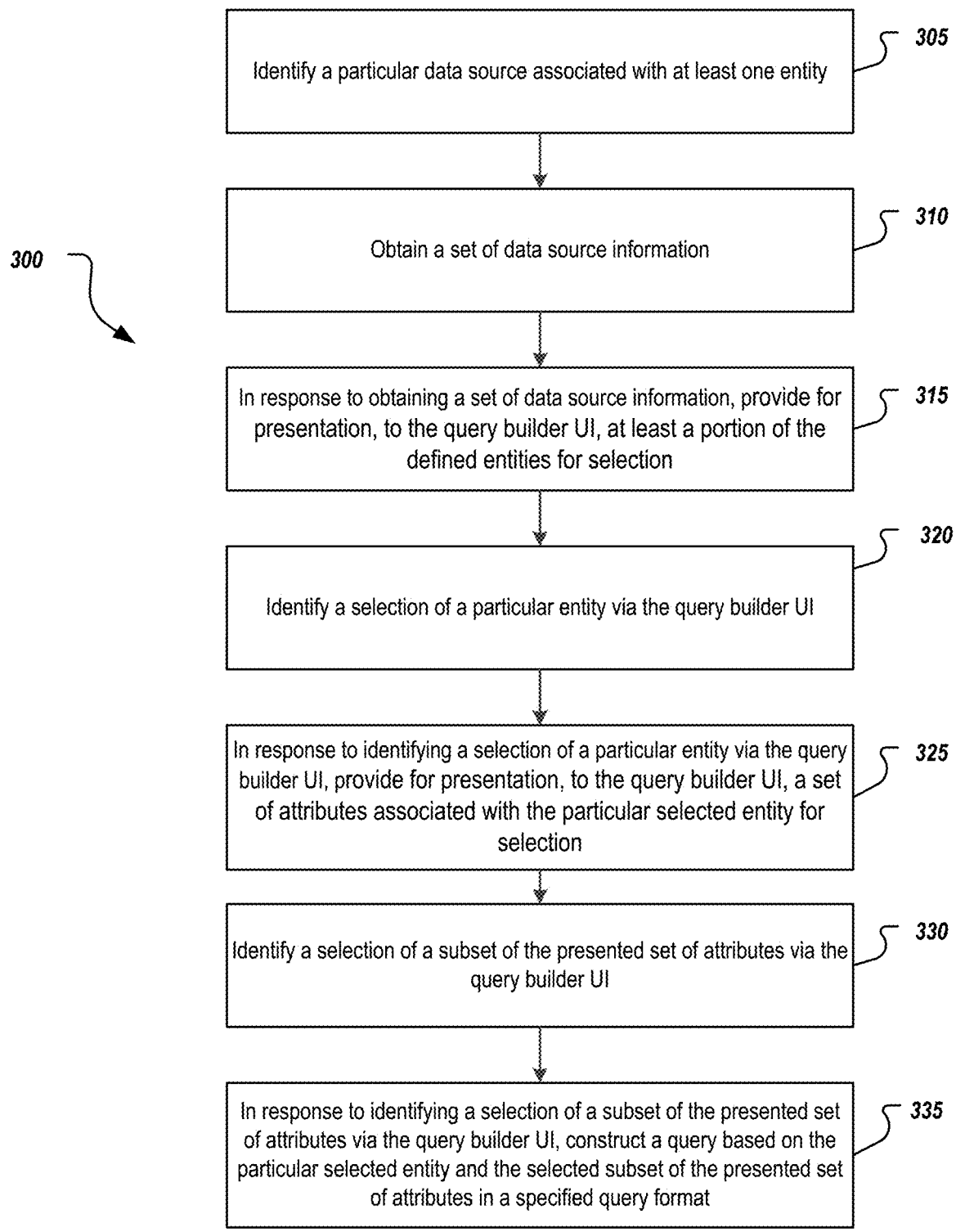
FIG. 3 represents an example flow for constructing a query associated with different data sources using an implementation of a query builder framework.

FIG. 3 represents an example flow 300 for constructing a query associated with different data sources. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a particular data source associated with at least one entity is identified. The particular data source can be identified in response to a user selection from a plurality of data sources presented via a query builder UI, or in response to an action (by the user or an application) otherwise determining that a query associated with the particular data source is to be constructed using the present solution. In some instances, the particular data source is selected by the user from the query builder UI, and the selected data source is passed to the query builder framework to identify a custom adapter associated with that data source. Using the custom adapter, information about how to generate a query for the data source may be available to the query builder framework, and can be used to construct an appropriate query.

At 310, a set of data source information defining at least one entity included in or associated with the particular data source and a set of metadata associated with the particular data source can be obtained by the backend system. The data source information and the metadata may be available or associated with the custom adapter corresponding to the data source, or information on how to access the data source to obtain the information may be provided. The data source information, including the set of metadata information, can be used to understand the data source and determine how the query is to be constructed, as well as the options available to users via the query builder UI. In some instances, the set of data source information is associated with the data source URL, and the set of metadata associated with the particular data source is associated with the metadata URL. Further, the set of data source information from the data source URL and the set of metadata from the metadata URL can be obtained via a web-based request. In another instance, the data source information may be associated with one or more translations used to interpret the metadata associated with the data source. The metadata translations may be associated with or identified by a unique identifier, which can be accessed from a metadata translation store and used to interpret the metadata associated with the data source.

At 315, in response to obtaining the set of data source information a query builder UI associated with the query builder framework can be provided for presentation. In doing so, at least a portion of the entities associated with the data source may be made available for selection. In some instances, a first window or application screen of the query builder UI may be used for the selection of the associated entities. The associated entities can correspond to or be a subset of the set of data source information previously obtained.

At 320, a selection of a particular entity is identified via the query builder UI. At 325, in response to identifying a selection of a particular entity via the query builder UI, a set of attributes associated with the particular entity can be identified and provided for presentation to the query builder UI. The set of attributes may be determined based on the set of metadata associated with the particular data source and associated with the particular selected entity. In some instances, after the user selects the entity and navigates from the first window or application screen, the query builder UI may have a second window or application screen to display options for selecting the attributes associated with the selected entity. In some instances, the first window or application screen may be adapted or dynamically modified to present the available attributes without moving to a second window or application screen. In addition to, or after the selection of the attributes, additional information may be selectable by the user via the query builder UI. For example, a particular presentation parameter may be available that allows the user to select how the results of the constructed query will be presented, such as an order by information, as well as other display-related options. Further, additional query-related options and parameters may be defined via the query builder UI, such as adding additional restrictions or filters on the information to be presented.

At 330, a selection of a subset of the presented set of attributes is identified via the query builder UI. At 335, in response to identifying a selection of a subset of the presented set of attributes via the query builder UI, a query based on the particular selected entity and the selected subset of the presented set of attributes is constructed in a specific query format associated with and/or defined by the custom adapter of the particular data source. Specifically, the specific query format associated with the data source can be applied to the selected entity and the selected attributes to generate a query that meets the format and syntax requirements of the data source. In some instances, the constructed query can be executed against the particular data source and can return the query results to the query builder UI. In some instances, the constructed query can be provided for presentation to the query builder UI for review by the user. In those instances, the query builder UI may allow users to interact and edit the constructed query, allowing tweaks and changes to the query, as well as further restriction and/or parameters to be manually added to the query prior to execution.

Figure 4:
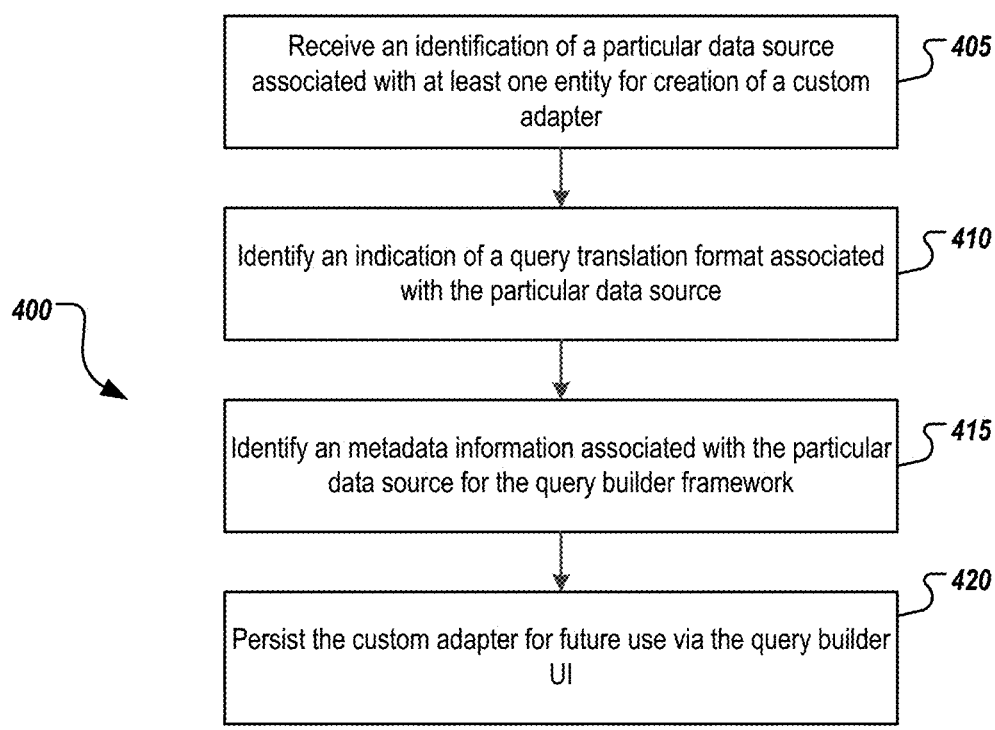
FIG. 4 represents an example flow for defining one or more custom adapters used in an implementation of a query builder framework used to construct queries associated with different data sources.

FIG. 4 represents an example flowchart 400 for defining the custom adapters used in generating queries associated with particular data sources. FIG. 4 can be executed at any suitable time, including during or after the operations described in FIG. 3. Moreover, it will be understood that method 400 may be performed, for example, by any other suitable system, environment, software, and hardware, or a combination of systems, environments, software, and hardware as appropriate.

At 405, a particular data source associated with at least one entity is identified as a data source upon which a custom adapter is to be created. The particular data source may be identified by a developer creating and defining a custom adapter for one of a plurality of data sources. In some instances, the particular identified data source is selected by a developer having particular knowledge of the data source, as well as the specific query format used and required by the data source. The custom adapter, once generated, can be used by a query builder framework for user-defined queries created using a query builder UI that allows non-technical users (or other users without the knowledge or time to determine the particular requirements of a data source) to define queries for the particular data source based on the data source's metadata and available entities in a simple and streamlined manner. The data source may store or be associated with the information needed by a query builder framework that is used to generate a query in a required format.

At 410, in response to the creation of the custom adapter, an indication of a query translation format associated with the particular data source is identified. The query translation format can be used to manipulate and format the selected entities and attributes, and any other relevant information, into a format required for the data source. The query translation format can be identified by the developer, and may be an already-used format (e.g., by one of the other data sources previously associated with another custom adapter) or in a new format that may need to be defined. In some instances, the custom adapter, in response to the identification of the query translation format, may be associated with a unique query translation key. That key can then be used to access the particular query translation indicated at runtime. In doing so, the format can be shared by multiple custom adapters. Formats already used can be selected from the available formats, while new formats may need additional definition and the assignment of a unique key for future description.

At 415, metadata information associated with the particular data source is identified. In some instances, the metadata information includes an indication of how metadata from the data source is to be interpreted. As different data sources may have different formats for their metadata, the metadata translation format can be used in future interactions with the data source to successfully interpret and understand the metadata. In some instances, the metadata translation data may be shared by one or more data sources. That translation data may be associated with a unique identifier and stored in the custom adapter for the data source, where the unique identifier references or links to a particular metadata translation to be applied. In some instances, the identified metadata information may identify the particular location at which the metadata can be accessed, such as a specific URL or other link storing the metadata.

At 420, the custom adapter is persisted for future use via the query builder UI. In some instances, the custom adapter is generated by a developer at design time. The developer can add custom adapters associated with a particular data source and in an implementation of a query builder framework to the integration platform. As such, the persisted custom adapter can take the user provided values and query via the query builder UI when connecting to the backend service in order to construct the specific query.

FIGS. 5A-5C illustrate an example implementation of a graphical user interface associated with the query builder framework and the query builder UI. As illustrated in FIG. 5A, a window or an application screen of the query builder UI 500A includes the option for the user to select an entity associated with a particular data source 170. Once the user selects the entity from the dropdown list, the user can navigate to the following screen by clicking on the next button.

FIG. 5B illustrates the graphical user interface that the user navigates to after clicking the next button in the previous query builder UI screen 500A. In this window or application screen, the user can select a set of attributes (e.g., ID, name, price, location, and size, as well as other attributes) associated with the previously selected entity. In the illustrated example, an option to select an order by capability is included in the UI screen 500B, where the option allows users to indicate how a query result will be ordered. The selection can be added to the constructed query along with the selected entity and attributes. The operations available to the user can include order by, group by, and where, as well as others.

In FIG. 5C, the adapter configuration UI 500C illustrates the input fields for the user to enter a data source URL corresponding to the data source and a metadata URL for retrieving the metadata information associated with the data source. In some instances, this information may be available and populated from the custom adapters. When the user clicks the build button, the generated query will be displayed in the field that corresponds to the query title field. In some implementations, the adapter configuration UI 500C can communicate with the query builder framework 108 by using a custom query translator 112.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in XML format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A computer-implemented method comprising:

identifying a particular data source associated with at least one entity, each data source associated with a custom adapter associated with a query builder framework, wherein each of the at least one entities is a specific table associated with the data source, and wherein each of the at least one entities is associated with one or more attributes;

obtaining a set of data source information defining each of the at least one entities and a set of metadata associated with the particular data source;

providing for presentation, via a query builder UI associated with the query builder framework, at least a portion of the at least one defined entities for selection;

in response to identifying a selection of a particular entity via the query builder UI, providing for presentation, via the query builder UI, a set of attributes associated with the particular selected entity for selection, the set of attributes defined in the set of obtained metadata associated with the particular data source and associated with the particular selected entity; and in response to identifying a selection of a subset of the presented set of attributes via the query builder UI, constructing a query based on the particular selected entity and the selected subset of the presented set of attributes in a specified query format associated with the custom adapter associated with the particular data source, wherein the custom adapter includes a set of query translation data providing the query builder framework with instructions on how to construct a query directed to the particular data source, and wherein each custom adapter is associated with a query format specific to the associated data source, and wherein constructing the query comprises:

identifying, based on the custom adapter associated with the particular data source, a predefined query translation format, wherein a plurality of predefined query translation formats are available, wherein each predefined query translation format is associated with a query translation key, and wherein each custom adapter identifies a particular query translation key to be used in constructing queries for the data source associated with the custom adapter; and
applying the identified predefined query translation format to the selected entity and the selected subset of the presented set of attributes to generate a translated query in the predefined query translation format.

2. The method of claim 1, wherein the particular data source is identified in response to a selection by a user from a plurality of data sources.

3. The method of claim 1, wherein each custom adapter is uniquely generated at design time.

4. The method of claim 1, wherein obtaining the set of data source information and the set of metadata associated with the particular data source comprises:
identifying, via the query builder UI, a data source URL and a metadata URL from a user, wherein the data source URL is associated with the set of data source information and the metadata URL is associated with the set of metadata associated with the particular data source; and
obtaining, via a web-based request, the set of data source information from the data source URL and the set of metadata from the metadata URL.

5. The method of claim 1, further comprising, in response to constructing the query:
executing the constructed query against the particular data source; and
returning a query result set responsive to executing the constructed query via the query builder UI.

6. The method of claim 1, further comprising, in response to constructing the query:
providing for presentation, via the query builder UI, an editable version of the constructed query in the specified query format.

7. The method of claim 1, further comprising, in response to obtaining the set of metadata associated with the particular data source:
identifying, based on the custom adapter associated with the particular data source, a predefined entity metadata translation format; and
translating the set of metadata associated with the particular data source using the identified predefined entity metadata translation format associated with custom adapter associated with the particular data source.

8. The method of claim 7, wherein a plurality of predefined entity metadata translation formats are available, each predefined entity metadata translation format associated with a metadata translation key, and wherein each custom adapter identifies a particular metadata translation key to be used in translating the set of metadata associated with the particular entity of the custom adapter.

9. A system, comprising:
at least one processor; and
a memory communicatively coupled to the at least one processor, the memory storing instructions which, when executed, cause the at least one processor to perform operations comprising:
identifying a particular data source associated with at least one entity, each data source associated with a custom adapter associated with a query builder framework, wherein each of the at least one entities is a specific table associated with the data source, and wherein each of the at least one entities is associated with one or more attributes;
obtaining a set of data source information defining each of the at least one entities and a set of metadata associated with the particular data source;
providing for presentation, via a query builder UI associated with the query builder framework, at least a portion of the at least one defined entities for selection;
in response to identifying a selection of a particular entity via the query builder UI, providing for presentation, via the query builder UI, a set of attributes associated with the particular selected entity for selection, the set of attributes defined in the set of obtained metadata associated with the particular data source and associated with the particular selected entity; and
in response to identifying a selection of a subset of the presented set of attributes via the query builder UI, constructing a query based on the particular selected entity and the selected subset of the presented set of attributes in a specified query format associated with the custom adapter associated with the particular data source, wherein the custom adapter includes a set of query translation data providing the query builder framework with instructions on how to construct a query directed to the particular data source, and wherein each custom adapter is associated with a query format specific to the associated data source, and wherein constructing the query comprises:
identifying, based on the custom adapter associated with the particular data source, a predefined query translation format, wherein a plurality of predefined query translation formats are available, wherein each predefined query translation format is associated with a query translation key, and wherein each custom adapter identifies a particular query translation key to be used in constructing queries for the data source associated with the custom adapter; and
applying the identified predefined query translation format to the selected entity and the selected subset of the presented set of attributes to generate a translated query in the predefined query translation format.

10. The system of claim 9, wherein the particular data source is identified in response to a selection by a user from a plurality of data sources, and wherein each custom adapter is uniquely generated by a developer at design time.

11. A non-transitory computer-readable medium storing instructions which, when executed, cause at least one processor to perform operations comprising:
identifying a particular data source associated with at least one entity, each data source associated with a custom adapter associated with a query builder framework, wherein each of the at least one entities is a specific table associated with the data source, and wherein each of the at least one entities is associated with one or more attributes;
obtaining a set of data source information defining each of the at least one entities and a set of metadata associated with the particular data source;
providing for presentation, via a query builder UI associated with the query builder framework, at least a portion of the at least one defined entities for selection;
in response to identifying a selection of a particular entity via the query builder UI, providing for presentation, via the query builder UI, a set of attributes associated with the particular selected entity for selection, the set of attributes defined in the set of obtained metadata associated with the particular data source and associated with the particular selected entity; and in response to identifying a selection of a subset of the presented set of attributes via the query builder UI, constructing a query based on the particular selected entity and the selected subset of the presented set of attributes in a specified query format associated with the custom adapter associated with the particular data source, wherein the custom adapter includes a set of query translation data providing the query builder framework with instructions on how to construct a query directed to the particular data source, and wherein each custom adapter is associated with a query format specific to the associated data source, and wherein constructing the query comprises:

identifying, based on the custom adapter associated with the particular data source, a predefined query translation format, wherein a plurality of predefined query translation formats are available, wherein each predefined query translation format is associated with a query translation key, and wherein each custom adapter identifies a particular query translation key to be used in constructing queries for the data source associated with the custom adapter; and applying the identified predefined query translation format to the selected entity and the selected subset of the presented set of attributes to generate a translated query in the predefined query translation format.

12. The computer-readable storage medium of claim 11, wherein the operations further comprise:

identifying, via the query builder UI, a data source URL and a metadata URL from a user, wherein the data source URL is associated with the set of data source information and the metadata URL is associated with the set of metadata associated with the particular data source; and obtaining, via a web-based request, the set of data source information from the data source URL and the set of metadata from the metadata URL.

13. The computer-readable storage medium of claim 11, wherein the operations further comprise:

executing the constructed query against the particular data source; and returning a query result set responsive to executing the constructed query via the query builder UI.

14. The computer-readable storage medium of claim 11, wherein the operations further comprise:

providing for presentation, via the query builder UI, an editable version of the constructed query in the specified query format.

* * * * *